United States Patent
Mendez et al.

(10) Patent No.: US 11,784,921 B2
(45) Date of Patent: Oct. 10, 2023

(54) ROUTE CONTROL TECHNIQUES

(71) Applicant: Arista Networks, Inc., Santa Clara, CA (US)

(72) Inventors: Trevor D. Mendez, Arlington, MA (US); Thanh Lam Thai, New Westminster (CA); Sharad Birmiwal, Surrey (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/863,523

(22) Filed: Apr. 30, 2020

(65) Prior Publication Data

US 2021/0344594 A1  Nov. 4, 2021

(51) Int. Cl.
*H04L 45/42* (2022.01)
*H04L 45/00* (2022.01)

(52) U.S. Cl.
CPC .............. *H04L 45/42* (2013.01); *H04L 45/70* (2013.01)

(58) Field of Classification Search
CPC ........ H04L 45/42; H04L 45/70; H04L 41/046
See application file for complete search history.

(56) References Cited

U.S. PATENT DOCUMENTS

| | | | | |
|---|---|---|---|---|
| 7,499,459 | B1* | 3/2009 | Scudder | H04L 45/02 370/389 |
| 2005/0135256 | A1* | 6/2005 | Ball | H04L 45/04 370/238 |
| 2007/0047446 | A1* | 3/2007 | Dalal | H04L 45/22 370/237 |
| 2007/0260746 | A1* | 11/2007 | Mirtorabi | H04L 45/02 709/238 |
| 2009/0006647 | A1* | 1/2009 | Balonado | H04L 47/10 709/238 |
| 2016/0142310 | A1* | 5/2016 | Means | H04L 63/0272 370/392 |
| 2017/0195181 | A1* | 7/2017 | Birmiwal | H04L 41/12 |
| 2017/0264552 | A1* | 9/2017 | Duda | H04L 45/02 |
| 2019/0058657 | A1* | 2/2019 | Chunduri | H04L 45/12 |
| 2020/0169496 | A1* | 5/2020 | Goliya | H04L 45/42 |
| 2020/0177489 | A1* | 6/2020 | Zeng | H04L 49/354 |
| 2021/0067463 | A1* | 3/2021 | Mukhopadhyay | H04L 45/028 |
| 2021/0105297 | A1* | 4/2021 | Beck | H04L 63/0236 |
| 2021/0135980 | A1* | 5/2021 | Pai | H04L 45/42 |
| 2022/0021600 | A1* | 1/2022 | Menon | H04L 41/5019 |

* cited by examiner

*Primary Examiner* — Glenton B Burgess
*Assistant Examiner* — Jihad K Boustany
(74) *Attorney, Agent, or Firm* — Tianyi He (57) ABSTRACT

Embodiments described herein relate to techniques for route control. The techniques may include obtaining, by a routing information base (RIB) agent, a route policy for performing a route action; receiving, by the RIB agent, a route from a routing protocol; analyzing, by the RIB agent, the route using to make a determination about whether to perform the route action; and performing, by the RIB agent, the route action based on the determination. Route actions may include actions relating to route modification, route redistribution, modifications of various attributes of a route, etc.

17 Claims, 3 Drawing Sheets

ROUTE CONTROL TECHNIQUES

BACKGROUND

Network device often have routes that dictate, at least in part, where a given network traffic data unit should be sent. Such routes are often stored in a routing information base (RIB). Various entities (e.g., protocol agents) may contribute route information to a RIB agent, which may, in turn, select routes to be installed in the RIB. Such routes may, or may not, be installed in a forwarding information base (FIB), or shared with protocol agents other than the protocol agent from which a route was received.

DETAILED DESCRIPTION

Specific embodiments will now be described with reference to the accompanying figures.

In general, embodiments described herein relate to techniques for shifting route analysis to a different location in the pipeline of route assessment in a network device and using a richer set of route attributes to perform the analysis. In one or more embodiments, a different location is a location that is different from where a route assessment usually occurs. For example, route assessment may be performed by a routing information base (RIB) agent after receiving a route from a border gateway protocol (BGP) agent, allowing the BGP agent to do a more simple assessment. In one or more embodiments, a richer set of attributes is a set of attributes that includes more information than another set of attributes. For example, a RIB agent may have available a wider variety of information with which to perform route analysis that a BGP agent has.

In one or more embodiments, RIB agents perform a variety of tasks, such as receiving route candidates from various route protocols and defined static routes, determining a winner from among those routes for a given destination to be added to a RIB, programming routes to a forwarding information base (FIB), programming forwarding equivalence classes (FECs), redistributing routes between protocols, etc. In one or more embodiments, as discussed above, RIB agents have greater visibility of a richer set of route information than other entities (e.g., protocol agents). For example, the various routing protocol agents only know about their own routes, and cannot see route information from other protocol agents, or RIB agents may be provided with information not available to other agents, such as the monetary cost associated with using a route that will use a particular autonomous system. Accordingly, changing the behavior of routing protocol agents to influence how or whether they present routes to a RIB agent, or request redistribution of other protocol routes from a RIB agent, would require redundant effort to modify each routing protocol agent.

In one or more embodiments, embodiments described herein solve that problem by leveraging the fact that the RIB agent is a central location that has a global view of information from all routing protocol agents, as well as static route information, and a variety of other items of information. As such, in one or more embodiments, the RIB agent is a more robust place to implement policies, via creation of route selection policies (e.g., using route maps), to influence system behavior regarding route actions taken when routes are received by a RIB agent.

As a first example, in one or more embodiments, a RIB agent is in a better position to influence which routes from among a set of routes to a same destination are chosen as a winner to be added to the RIB (which then may or may not later be programmed to a FIB based on other policies). For example, instead of merely considering the administrative distance assigned to routes from the various protocols at a per-protocol level, the RIB agent could consider a host of other route attributes and/or information related to a route (e.g., it may not be desirable to choose a Border Gateway Protocol (BGP) route through a particular autonomous system (AS) due to the monetary cost associated with a particular AS if there is another route available to the same destination) to override the decision that would be made on administrative distance alone.

As a second example, in one or more embodiments, a route with a particular next hop may have the next hop analyzed based on information known to the RIB agent, which may decide whether to deny the route, to modify the route to include a different next hop to the same destination, or to modify the next hop to send one or more network traffic data units to a security analysis device or firewall instead of its provided next hop. For example, consider a scenario in which a given next hop is known to the RIB agent to be in a portion of a network on which there has been an identified security breach. In such a scenario, the policy implemented by the RIB agent may check whether a given route includes that next hop, and, if so, modify the next hop in the route to re-direct packets associated with the route to the security analysis tool. The security analysis tool may then analyze the re-directed packets to determine information about the security issue.

As a third example, in one or more embodiments, the RIB agent may apply policies to determine whether to distribute a given route from one routing protocol to another. Routing protocols may request that a RIB agent provide them with routes from other routing protocols, which may, in turn, then be provided to peer devices to alert the peer devices that the network device on which the RIB agent is executing can reach a particular destination. However, in one or more embodiments, there are certain scenarios where the RIB agent may apply policies to prevent servicing or fully servicing such a request. For example, the RIB agent may have a policy that says to redistribute only the least specific route to a destination rather than all routes of varying levels of specificity, which may be referred to as route conservation. As another example, the RIB agent may be configured to know that some routes from a certain routing protocol are sensitive from a security perspective, and thus have a policy preventing redistribution of such routes.

Figure 1:
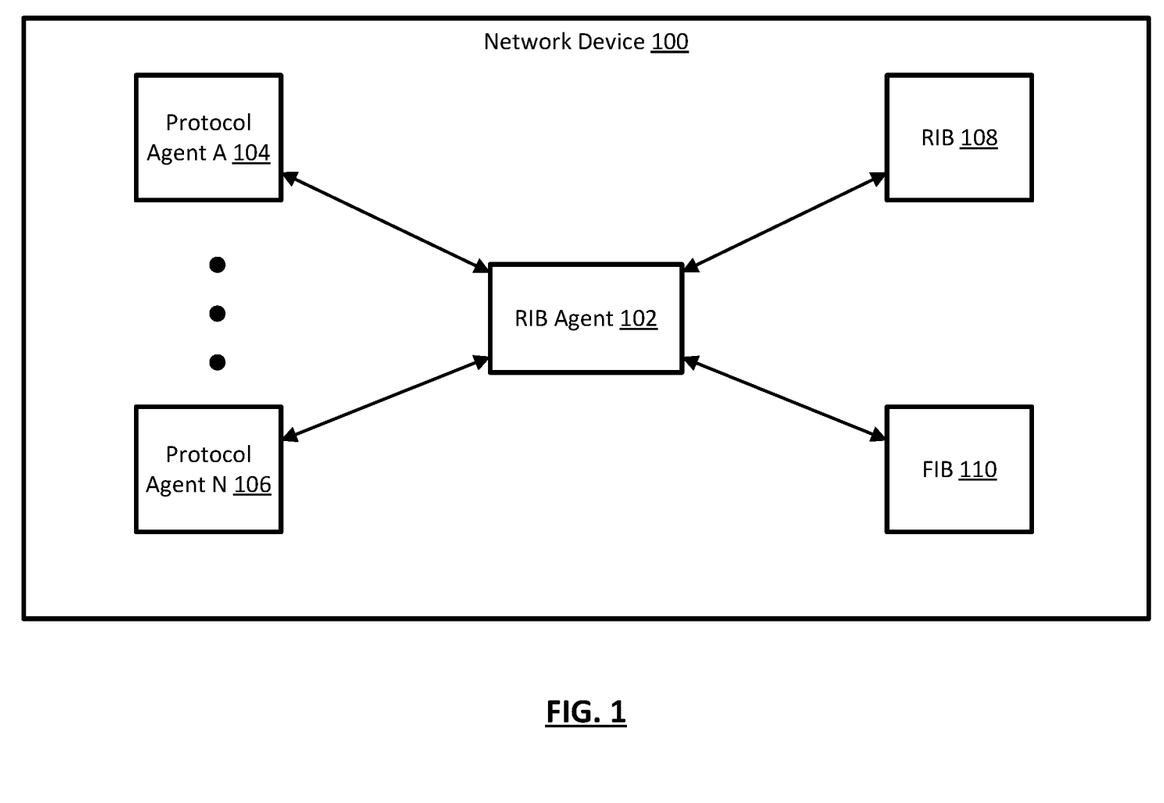
FIG. 1 shows a system in accordance with one or more embodiments described herein.

FIG. 1 shows a network device in accordance with one or more embodiments described herein. Network device (100) shown in FIG. 1 is only one example of a particular computing device. One having ordinary skill in the art, and the benefit of this Detailed Description, will appreciate that the techniques described herein may apply to any number of different network devices. Accordingly, embodiments described herein should not be considered limited to network device (100) shown in FIG. 1.

As shown in FIG. 1, network device (100) includes RIB agent (102), any number of protocol agents (e.g., protocol agent A (104), protocol agent N (106)), RIB (108) and FIB (110). Each of these components is described below.

In one or more embodiments, network device (100) is a physical device that includes and/or is operatively connected to persistent storage (not shown), memory (e.g., random access memory (RAM)) (not shown), one or more processor(s) (e.g., integrated circuits) (not shown), and at least one physical network interface (not shown) (which may also be referred to as a port), which may provide connections (i.e., links) to other devices (e.g., computing devices, other network devices, etc.). In one or more embodiments, network device (100) also includes any number of additional components (not shown), such as, for example, network chips, field programmable gate arrays (FPGAs), application specific integrated circuits (ASICs), indicator lights (not shown), fans (not shown), etc. In one or more embodiments, a network device is a virtual instance of a network device. Such a network device may, for example, be a virtual instance of a router that executes within a hypervisor that is itself executing using underlying physical hardware.

In one or more embodiments, network device (100) includes any software configured to perform various functions of the network device. Such software may, for example, execute using one or more processors of network device (100), or any other hardware resource of network device (100) capable of executing software. One example of such software is an operating system (OS) (not shown). In one or more embodiments disclosed herein, an OS includes any software and/or firmware for managing the resources (e.g., hardware, other software, etc.) of one or more computing devices (e.g., network device (100)). More specifically, an OS may be a program or set of programs that manages all or any portion of the other software (e.g., applications, agents, etc.) in a computing device (e.g., network device (100)), as well as all or any portion of the hardware of a computing device. Management by an OS may include scheduling, hardware allocation, application execution, network access, management of access to stored files that are selectively made available to applications running on the OS, etc. An OS may also manage and enforce settings and permissions customized for specific applications running within the OS. In one or more embodiments, an OS provides an environment in which agents execute. Agents are discussed further below.

Examples of a network device include, but are not limited to, a network switch, a router, a multilayer switch, a fibre channel device, an InfiniBand® device, etc. A network device is not limited to the aforementioned specific examples.

In one or more embodiments, network device (100) includes functionality to receive network traffic data units (e.g., frames, packets, tunneling protocol frames, etc.) at any of the network interfaces (i.e., ports) of network device (100) and to process the network traffic data units. In one or more embodiments, processing a network traffic data unit includes, but is not limited to, a series of one or more table lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Such a series of lookups and corresponding actions may be referred to as a pipeline, and may be, for example, programmed as a match-action pipeline. Examples of pipeline processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device.

In one or more embodiments, the network device is part of a network (not shown). A network (not shown) may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, a network may be coupled with or overlap, at least in part, with the Internet. In one or more embodiments, a network includes a collection of one or more devices (e.g., network device (100)) that facilitate network connectivity for one or more operatively connected devices (e.g., computing devices, data storage devices, other network devices, etc.) (not shown). In one or more embodiments, network device (100) and other devices within the network are arranged in a network topology (not shown). In one or more embodiments, a network topology is an arrangement of various devices of a network.

In one or more embodiments, the persistent storage and/or memory of network device (100) may be or include one or more data repositories for storing any number of data structures storing any amount of data (i.e., information). In one or more embodiments, a data repository is any type of storage unit and/or device (e.g., a file system, database, collection of tables, RAM, and/or any other storage mechanism) for storing data. Further, the data repository may include multiple different storage units and/or devices. The multiple different storage units and/or devices may or may not be of the same type or located at the same physical location.

In one or more embodiments, the persistent storage and/or memory of network device (100) may be considered, in whole or in part, as non-transitory computer readable mediums storing, at least in part, software and/or firmware.

Such software and/or firmware may include instructions which, when executed by the one or more processors (not shown) or other hardware (e.g. circuitry) of network device (100), cause the one or more processors and/or other hardware components to perform operations in accordance with one or more embodiments described herein.

Such software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape, flash memory, physical memory, or any other non-transitory computer readable medium.

In one or more embodiments, network device (100) includes any number of agents (e.g., RIB agent (102), protocol agent A (104), protocol agent N (106)). In one or more embodiments, an agent is any hardware (e.g., circuitry), software, firmware, or any combination thereof that includes functionality to perform any tasks or actions for which it was designed. Examples of agent functionality include, but are not limited to: monitoring hardware; monitoring other software; monitoring log files; receiving information; parsing information; writing information (e.g., to hardware tables); performing repetitive tasks (e.g., data backup, memory management, etc.); providing an environment for a user to interact, locally or remotely, with hardware and/or software components of network device (100); automatically adding data to certain types of fields; performing management functions; simulating other software and/or hardware; sending an/or receiving signals (e.g., beacon signals) to determine if a device is still in contact with another device; any other task or action; processing/interpreting information; sending/distributing information; or any combination thereof.

An agent may be a process, or a part of a process, may include one or more threads within one or more processes, and/or may be capable of creating additional threads. An agent may be operatively connected to volatile storage devices and/or to non-volatile storage devices of network device (100). In one or more embodiments, an agent executes within an operating system (not shown) using one or more processors (not shown) of network device (100).

In one or more embodiments, a portion of the agents of network device (100) are protocol agents (e.g., protocol agent A (104), protocol agent N (106)). In one or more embodiments, a protocol agent is an agent implementing a routing protocol. In one or more embodiments, a routing protocol is a protocol for managing route information in a network. For example, a routing protocol may learn route information from neighbor network devices, store such route information, share route information with other neighbor devices, provide candidate routes to a RIB agent (discussed below) for further processing, and/or request route information from other protocols from a RIB agent. In one or more embodiments, protocol agents are operatively connected to a RIB agent.

Examples of protocol agents include, but are not limited to: a Border Gateway Protocol (BGP) agent; an Interior Gateway Protocol (IGP) agent (e.g., Open Shortest Path First (OSPF), Routing Information Protocol (RIP), Intermediate System to Intermediate System (IS-IS), Enhanced Interior Gateway Routing Protocol (EIGRP), etc.); a static route agent, etc.

In one or more embodiments, at least one of the agents of network device (100) is RIB agent (102). In one or more embodiments, RIB agent (102) is an agent configured to centrally manage route information for network device (100). In one or more embodiments, managing route information includes, but is not limited to, receiving route candidates from various protocol agents and/or defined static routes, determining a winner from among such routes for a given destination, storing routes in a RIB (discussed below) programming routes to a FIB (discussed below), programming FECs with sets of next-hops, redistributing routes between protocols, etc. In one or more embodiments, RIB agent (102) has access to route information from routes stored in the RIB, and may request additional route information for other routes from, for example, protocol agents.

In one or more embodiments, RIB agent (102) stores any amount of additional information that may be necessary to perform the function of route management.

Examples of such information include, but are not limited to: information regarding defined route policies for use in managing routes; bandwidth; latency; path reliability; security issues in a network; monetary cost information associated with various autonomous systems; information regarding loads on ports of network device (100) and/or load balancing information regarding the same; information regarding maximum transmission unit (MTU) size for a given path; hop count; upcoming maintenance of other network devices; whether other network devices are experiencing technical issues (e.g., power problems, wiring problems, etc.); whether given ports of network device (100) are experiencing technical issues (e.g., repetitively going down); geographic information related to various paths and/or autonomous systems; information relating to network load at various times of a day, week, month, year, etc.; information relating to entities providing access to or having control of given autonomous systems; which protocols are configured to be more trusted by network device (100); information regarding disruptions in internal networks; information regarding paths to devices implementing security policies in a network; information regarding blacklisted (or whitelisted) network prefixes and/or next-hops; information regarding access control lists, information regarding times at which certain routes, routing protocols, paths, next-hops, etc. are preferred over others; information relating to specificity of routes (e.g., using subnet masks); information relating to default routes; etc. Information available to RIB agent (102) is not limited to the aforementioned examples.

In one or more embodiments, RIB agent (102) is configured to manage routes based on one or more algorithms. For example, RIB agent (102) may be configured to select a route to install in a RIB from among a set of routes to a destination presented by various protocol agents (104, 106) based on which route has a lowest administrative distance. In one or more embodiments, an administrative distance is an alpha-numeric unit (e.g., a number) assigned to a route, and may be based on any information relating to a route, may be presented to RIB agent (102) by routing protocol agents (104, 106), may be assigned or modified by RIB agent (102), and/or any combination thereof. Values other than administrative distance may be used by RIB agent (102) for route management without departing from the scope of embodiments described herein.

In one or more embodiments, a RIB agent is configured with one or more policies to influence route management. For example, RIB agent (102) may be configured with policies for route selection for installing a route in a RIB, route selection for installing a route from a RIB in a FIB, FEC management, route redistribution, route modification, route conservation, etc. RIB agent (102) may be configured with policies other than the aforementioned examples without departing from the scope of embodiments described herein.

In one or more embodiments, RIB agent (102) implements policies via application of route maps to routes. In one or more embodiments, a route map is a sequence of statements that is evaluated for routes RIB agent (102) receives and/or seeks to action on. In one or more embodiments, the statements of a route map, perform two basic functions: first a determination is made whether a route has a particular attribute (based on any of the above-described information available to RIB agent (102)); second, if a route does have the particular attribute, an action is performed. For example, such an action may be to set a particular attribute to a particular value (which may or may not be the same attribute that was matched on). In such an example, when a route has a particular attribute, RIB agent (102) may increase or decrease the administrative distance assigned to the route to influence whether it is selected to be installed into the RIB, may alter the next-hop for the route, etc. There may be a list of such statements in a given route map, each of which are evaluated for the route.

As a non-limiting example, an anycast-based network service may be accessible by choosing either a BGP-learned offering from an external service provider or an OSPF-learned offering from an internal service provider. The external service provider's offering may have a predictable quality, while varying in financial cost based on demand, as indicated by whether or not a particular BGP community is attached to the route. The internal service provider's offering may have a constant financial cost while varying in quality, as indicated by the IGP metric to the destination.

In such a scenario, RIB agent may receive 2 routes to the anycast destination, with the relative merit depending on the specifics of the route attributes. The RIB agent may be configured with an algorithm that is able to assign comparable administrative preference values to such routes allowing the RIB to choose the more suitable route at any given time. The algorithm may implement a utility function, U(q, f), that takes the expected quality, q, and the expected financial cost, f, as inputs. The quality associated with a BGP route for this service may be fixed, whereas the financial cost takes 1 of 2 values may depend on whether a BGP community is attached. The quality associated with an IGP route for this service may be assigned a value from ranges of IGP metric values, whereas its financial cost may be fixed.

When the IGP metric is low enough (the quality is good), the computed administrative preference for the IGP route may be lower than that of any available BGP route, and the IGP route may be installed in the RIB. When the IGP metric increases moderately, a BGP route with modest financial cost may become preferable, so the BGP route may be installed in RIB instead. If the BGP route becomes more financially costly (as indicated by the presence of a BGP community), the IGP route may become preferable again in spite of its mediocre quality.

In one or more embodiments, a route map is implemented in the running configuration of RIB agent (102), and is stored on persistent storage and/or memory of network device (100). In one or more embodiments, a route map is created by configuring a series of one or more match (does an attribute of a route match a criteria) and/or set (what action to perform relative to the route) statements, giving the route map a name, and configuring RIB agent (102) to use the route map. Therefore, in one or more embodiments, the match statements check if an attribute matches the statement, and may lead to a permit or deny of the route for consideration by the route selection algorithm, and, if permitted, set statements may optionally modify an attribute of the route.

Although the foregoing description of a route map as the mechanism for applying policies relating to route management by RIB agent (102), one having ordinary skill in the art will recognize that RIB agent (102) may use any scheme of assessing route attributes and other information, and taking actions related to routes, without departing from the scope of embodiments described herein. Accordingly, in one or more embodiments, policy configuration allows users to specify policies for each (managed) function of RIB agent (102). In one or more embodiments, such policies serve as filters for actions of RIB agent (102).

In one or more embodiments, RIB agent (102) is operatively connected to RIB (108). In one or more embodiments, a RIB is a data structure stored in memory and/or persistent storage of network device (100). In one or more embodiments, RIB (108) is a data structure that stores information related to routes, which may be statically configured, learned dynamically from a routing protocol agent (e.g., protocol agent A (104), protocol agent N 106)), or relate to networks directly connected to network device (100). In one or more embodiments, information relating to a given route is stored as a RIB entry in RIB (108). In one or more embodiments, a RIB entry may include any information related to a route. Such information may include statically configured route information, dynamically learned route information, and/or any other information known to RIB agent (102) (discussed above). For example, a RIB entry may include a destination subnet identifying a network, a next-hop to reach the network, an interface connected to the next-hop, various metrics about the route, and/or any other information relevant to the route. In one or more embodiments, RIB agent (102) manages the RIB entries in RIB (108), which may include adding entries, removing entries, and/or modifying entries. As an example, RIB (108) may be in the form of a database, managed by RIB agent (102) with each entry in the database being a RIB entry. In one or more embodiments, a RIB is considered to be within the control and/or management plane of network device (100).

In one or more embodiments, RIB agent (102) is operatively connected to FIB (110). In one or more embodiments, FIB (110) is a data structure stored in storage of one or more hardware components network device (100). In one or more embodiments, FIB (110) is a data structure that stores information related to how to send a network traffic data unit destined for a destination within a given network to an appropriate next-hop using the correct interface of network device (100). In one or more embodiments, such information relating a given destination network is stored as a FIB entry in FIB (110). In one or more embodiments, a FIB entry is based at least in part on a corresponding RIB entry, and may include all or any portion of the information stored in a RIB entry. For example, a FIB entry may include, but is not limited to, a destination subnet identifying a network, a next-hop to reach the network, and an interface connected to the next-hop. In one or more embodiments, FIB (110) is accessed to process network traffic data units received at network device (100) and, if possible, identify the egress interface out of which the network traffic data unit should be sent to reach a given next-hop, if possible. In one or more embodiments, RIB agent (102) manages the FIB entries in FIB (110), which may include adding entries, removing entries, and/or modifying entries. As an example, FIB (110) may be in the form of a content addressable memory (CAM) table, managed by RIB agent (102) with each entry in the table being a FIB entry. In one or more embodiments, FIB (110) is considered to be within the data or forwarding plane of network device (100).

While FIG. 1 shows a configuration of components, other configurations may be used without departing from the scope of embodiments described herein. For example, a network device may include any number of agents. As another example, a network device may include any number of FIBs. As another example, a network device may include any number of RIBs. As another example, a network device may include any number of components not shown in FIG. 1. Accordingly, embodiments disclosed herein should not be limited to the configuration of components shown in FIG. 1.

Figure 2:
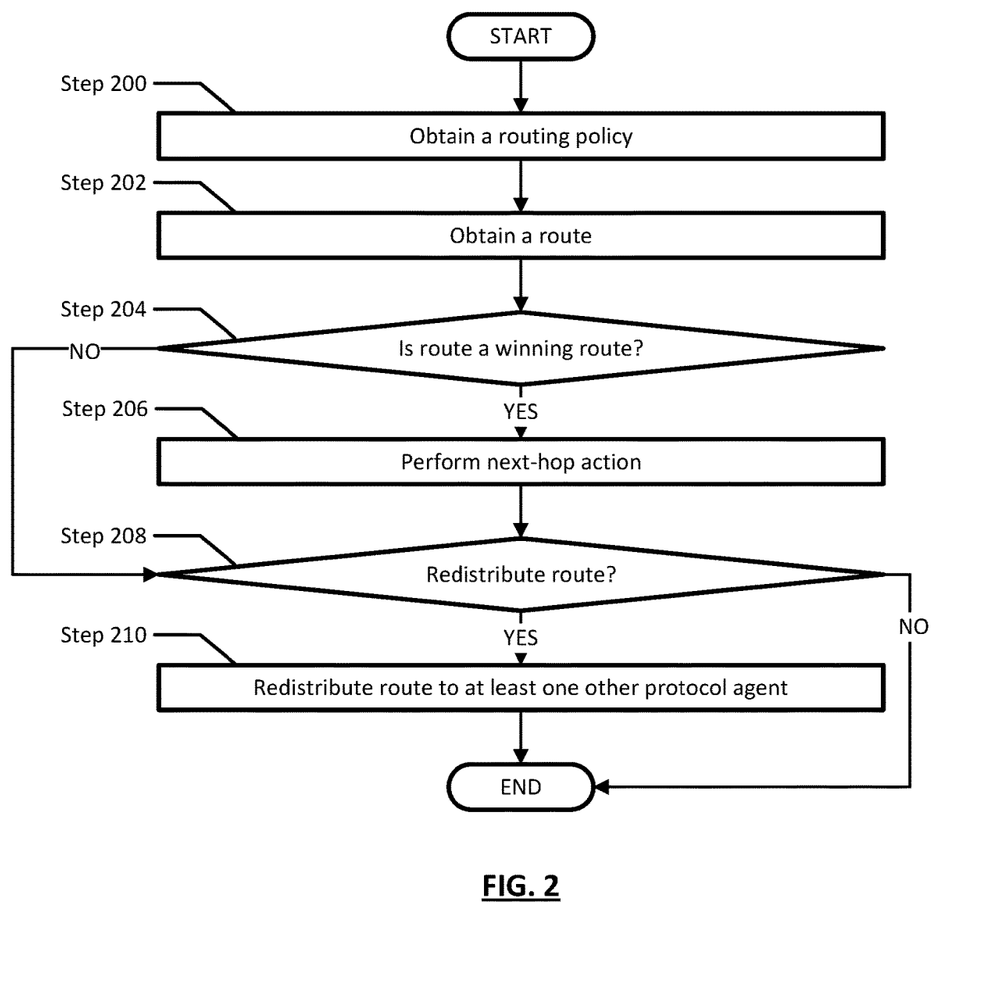
FIG. 2 shows a flowchart in accordance with one or more embodiments described herein.

FIG. 2 shows a flowchart describing a method for performing actions related to routes in accordance with one or more embodiments described herein. The method for such route management shown in FIG. 2 is only one example of a particular scheme for route management. Accordingly, embodiments described herein should not be considered limited to the information sharing topology creation and use shown in FIG. 2.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, that some or all of the steps may be executed in parallel, and/or that other steps than what is shown in FIG. 2 may be performed.

In Step 200, a routing policy is obtained. In one or more embodiments, as discussed above in the description of FIG. 1, a routing policy is any policy in any form that provides information related to how to assess a given route or set of routes and/or take actions related to the route or set of routes. In one or more embodiments, the routing policy is a series of match and set statements. As an example, a routing policy may be in the form of a route map. A routing policy may be obtained, for example, from a network administrator, a local or remote user of a network device, a remote device that distributes routing policies in a network, etc.

In Step 202, at least one route is obtained using any scheme for obtaining a route. In one or more embodiments, a route is obtained by a RIB agent. In one or more embodiments, a route is obtained via receipt from a protocol agent running a given routing protocol on a network device. In one or more embodiments, a route is statically configured (e.g., using a RIB agent). In one or more embodiments, a route is obtained by a RIB agent from among the routes already present in RIB and/or FIB and matching some route characteristic or attribute.

In Step 204, a determination is made as to whether a route obtained in Step 202 is a winning route. In one or more embodiments, the selection of a winning route is determined, at least in part, by application of a routing policy (e.g., a match-set route policy that adjusts one or more attributes of a route relevant to a route selection policy of a RIB agent).

In one or more embodiments, the route is a winner if it is selected from one or more routes to a destination presented to a RIB agent from one or more protocol agents, and, as such, may be installed into the RIB and/or, later, into the FIB. In one or more embodiments, a route may be considered a winner because the route was previously considered a winner and, as such, is already installed in a RIB and/or FIB. In one or more embodiments, a route is considered a winner if the route selection algorithm and/or a routing policy identify a route as such. In one or more embodiments, if a route is not determined to be a winning route, the method proceeds to Step 208. In one or more embodiments, if a route is determined to be a winning route, the method proceeds to Step 206.

In Step 206, a next-hop action is performed. In one or more embodiments, the collection of possible next-hop actions that may be taken for a given route include, but are not limited to, installing the route with its existing next-hop in a RIB, denying the route from installation in the RIB, modifying the route prior to its installation in the RIB (e.g., to include a different next-hop), modifying a route that already existed in the RIB, having route use a different next-hop in a FEC, add new next-hops to a FEC, etc. Such actions may be performed, for example, by a RIB agent.

In Step 208, a determination is made as to whether a route should be redistributed to any routing protocol agents that are different from a routing protocol agent from which a route was received. As an example, a BGP agent may learn its set of routes and publish such routes to the RIB agent. In one or more embodiments, the OSPF agent also learns its routes and publishes the routes to the RIB agent. Sometimes, the RIB agent might want to learn routes from the OSPF agent, and distribute them to BGP peers. Such action may accomplish a BGP informing neighbor network devices that if they want to get to this OSPF address, the BGP agent is aware of how to get a network traffic data unit to that address. So, for example, if the RIB agent prefers (based on a routing policy) an OSPF route more than a BGP route, the RIB agent may choose, based on a routing policy, to redistribute OSPF route to the BGP agent, and that route will be shared with BGP peers of the network device.

However, having a routing policy that takes into consideration more information than preference (e.g., administrative distance), and chooses to permit or deny redistribution based on that additional information, may cause the decision may be influenced to a different outcome. For example, such actions may be used to create a blacklist of routes that cannot be leaked to other protocols. As another example, a RIB agent may prevent redistribution of more specific routes when the default or less specific route exists (e.g., via the use of routing policies). For example, consider a scenario in which a RIB agent is aware of many routes of varying levels of specificity to a given destination available from IGPagents. In such a scenario, the RIB agent may have a route that covers the more specific routes, yet only redistribute the less specific route (which could, for example, be a default route). Said another way, a routing policy may be configured for use by a RIB agent that states: if less specific route exists in OSPF, that is sufficient to be leaked across protocol boundaries. So, as an example, if the less specific route is 10.0.0.0/8, the RIB agent leaks that, and not the route for 10.20.0.0/16, 10.20.30.0/24, or 10.20.30.3/32.

In one or more embodiments, if a determination is made not to redistribute a given route from one protocol to another, the method ends. In one or more embodiments, if a determination is made to redistribute a given route from one protocol to another, the method proceeds to Step 210.

In Step 210, a given route for which a determination was made in Step 208 should be distributed to one or more additional protocols, is distributed to the one or more protocols implementing such protocols. Such routes may or may not then be shared with neighbor devices that have peered with the originating network device in a routing protocol.

Figure 3:
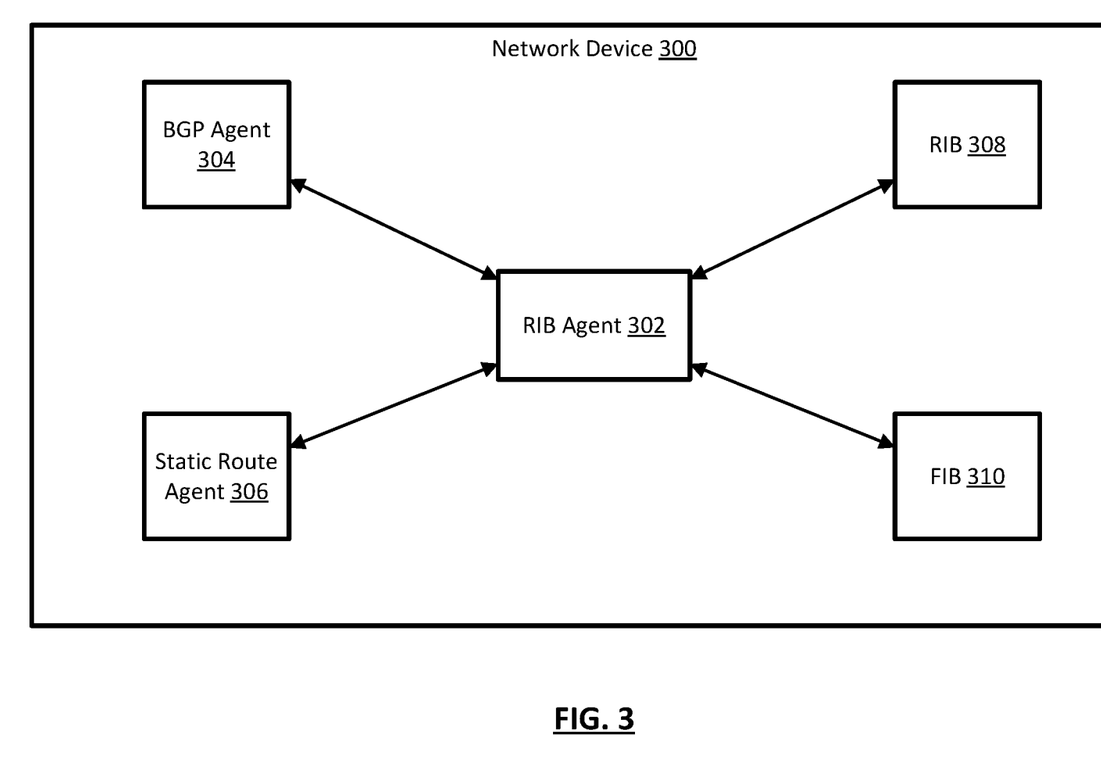
FIG. 3 shows an example in accordance with one or more embodiments of described herein.

FIG. 3 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 3, consider a scenario in which network device (300) includes RIB agent (302). RIB agent (302) is operatively connected to BGP agent (304), static route agent (306), RIB (308), and FIB (310). In such a scenario, RIB agent (302) is configured with several routing policies expressed as route maps.

At a first time, RIB agent (302) is presented with a route from BGP agent (304), and another static route configured by a user using static route agent (306), each to the same destination network. In one or more embodiments, the route received from BGP agent (304) indicates that it has an administrative distance of twenty, and that the route travels through an autonomous system controlled by a service provide that is traditionally very monetarily expensive. In one or more embodiments, the static route has a configured administrative distance of thirty, but does not travel through an expensive autonomous system. In one or more embodiments, the routing policy with which RIB agent (302) is configured identifies both routes as routes to be analyzed using the appropriate route map. Based on the series of statements within the route map, the BGP route is left unmodified, but the static route has its administrative distance reduced to one.

Next, RIB agent (302) applies a route selection algorithm based on administrative distance. Because the static route now appears to have the lower administrative distance after application of the route map, the static route is selected for installation into the RIB, from where it is later installed in the FIB. Thus, by application of the routing policy, the static route, which avoids the costly autonomous system, is the route selected for use in further transmission of network traffic data units to the destination network.

Continuing with the above-described scenario, RIB agent (302) next applies a second routing policy relating to possible adjustment of the next-hop of a route based on certain network conditions known by RIB agent (302). Specifically, RIB agent (302) identifies that the next-hop identified in the route attributes relating to the OSPF route installed in the RIB is a next hop known to RIB agent (302) to be within a segment of the network that is experiencing known security issues. In one or more embodiments, based on application of the second routing policy to the route, RIB agent (302) modifies the route to include a next-hop that directs network traffic units to a security analysis device. In one or more embodiments, the security analysis device, upon receipt of network traffic data units travelling the path, analyzes the network traffic data units to attempt to obtain information relating to the security issue known to RIB agent (302).

Next, RIB agent (302) makes a determination whether to distribute the route to non-OSPF routing protocols. Two choices are available. First, RIB agent (302) may be configured to blacklist the route, and, therefore, not distribute it, because it includes a next-hop that is associated with a known security issue. Second, RIB agent could choose to distribute the route, knowing that doing so will ultimately drive more network traffic data units to the next-hop associated with the security issue. In this scenario, a third routing policy with which RIB agent (302) is configured is intended to mitigate risk by avoiding having traffic sent to the network portion experiencing the security issue. Accordingly, based on application of the third routing policy, RIB agent (302) does not redistribute the static route to any other routing protocol.

In one or more embodiments, because of the variety of information available to the RIB agent, the RIB agent is able to apply routing policies that implement a wider variety of useful route management policies, thereby allowing a network device to implement improved routing policies than are available with existing routing policy application schemes.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While a limited number of embodiments have been described herein, those skilled in the art, having benefit of this disclosure, will appreciate that other embodiments can be devised which do not depart from the scope of the embodiments described herein. Accordingly, the scope of embodiments described herein should be limited only by the attached claims.

What is claimed is:

1. A network device, comprising:
   a processor;
   a memory that stores a routing information base (RIB); and
   wherein the processor is configured to execute a RIB agent that manages entries in the RIB, a first routing protocol agent that implements a first type of routing protocol, and a second routing protocol agent that implements a second type of routing protocol, and
   wherein the RIB agent, when executing on the processor, is configured to:
      obtain a routing policy;
      obtain a first route from the first routing protocol agent and a second route from the second routing protocol agent;
      modify, using the routing policy, an initial value of an attribute of the first route to obtain a first updated route with a new value for the attribute, wherein the modifying of the initial value of the attribute occurs before a route selection by the RIB agent;
      perform the route selection on the first updated route and the second route to select the first updated route;
      perform a next-hop action on the first updated route, wherein the RIB agent uses an item of information that is unavailable to the first and second routing protocol agents to perform the next-hop action;
      after performing the next-hop action,
         make a determination about whether to distribute the first route to the second routing protocol agent; and based on the determination, not distribute the first route to the second routing protocol agent or distribute the first route to the second routing protocol agent.

2. The network device of claim 1, wherein the routing policy comprises a set of statements that determines the modification to be performed on the first route.

3. The network device of claim 1, wherein the next-hop action is to deny network traffic data units destined for a next-hop of the first updated route, to modify the next-hop of the first updated route to an updated next-hop of the first updated route that is on a path to a same destination, or to modify the next-hop of the first updated route to at least one security policy implementation next-hop.

4. The network device of claim 1, wherein the first updated route is not distributed to the second routing protocol agent when second routing protocol agent has a less specific route to a same destination as the first updated route.

5. The network device of claim 1, wherein the RIB agent is configured to modify an entry in the RIB based on the route selection.

6. The network device of claim 1, wherein the first type of routing protocol is Border Gateway Protocol (BGP) and the second type of routing protocol is Interior Gateway Protocol (IGP).

7. A method, comprising:
   obtaining, by a routing information base (RIB) agent, a routing policy;
   receiving, by the RIB agent, a Border Gateway Protocol (BGP) route from a BGP agent and a non-BGP route based on a non-BGP protocol;
   modifying, by the RIB agent and using the routing policy, an initial value of an attribute of the non-BGP route to obtain an updated non-BGP route with a new value for the attribute, wherein the modifying of the initial value of the attribute occurs before a route selection by the RIB agent;
   performing, by the RIB agent, the route selection on the updated non-BGP route and the BGP route to select the updated non-BGP route; and
   performing, by the RIB agent, a next-hop action on the updated non-BGP route, wherein the RIB agent uses an item of information indicated by the routing policy and unavailable to the BGP agent to perform the next-hop action.

8. The method of claim 7, wherein the routing policy comprises a set of statements that determines the modification to be performed on the non-BGP route.

9. The method of claim 7, wherein the next-hop action is to deny network traffic data units destined for a next-hop of the updated non-BGP route, to modify the next-hop of the updated non-BGP route to an updated next-hop of the updated non-BGP route that is on a path to a same destination, or to modify the next-hop of the updated non-BGP route to at least one security policy implementation next-hop.

10. A non-transitory computer readable medium comprising instructions that, when executed by a processor for a routing information base (RIB) agent that manages entries in a RIB, perform a method, the method comprising:
   obtaining, by the RIB agent, a routing policy;
   receiving, by the RIB agent, a first route from a first routing protocol agent that implements a first type of protocol and a second route from a second routing protocol agent that implements a second type of protocol;
   modifying, by the RIB agent and using the routing policy, an initial value of an attribute of the first route to obtain a first updated route with a new value for the attribute, wherein the modifying of the initial value of the attribute occurs before route selection;
   performing the route selection on the first updated route and the second route to select the first updated route;
   performing a next-hop action on the first updated route, wherein an item of information that is unavailable to the first and second routing protocol agents to is used to perform the next-hop action;
   after performing the next-hop action,
      make a determination about whether to distribute the first route to the second routing protocol agent; and
      based on the determination, not distribute the first route to the second routing protocol agent or distribute the first route to the second routing protocol agent.

11. The non-transitory computer readable medium of claim 10, wherein the routing policy comprises a set of statements that determines the modification to be performed on the first route.

12. The non-transitory computer readable medium of claim 10, wherein the next-hop action is to deny network traffic data units destined for a next-hop of the first updated route, to modify the next-hop of the first updated route to an updated next-hop of the first updated route that is on a path to a same destination, or to modify the next-hop of the first updated route to at least one security policy implementation next-hop.

13. The non-transitory computer readable medium of claim 10, wherein the first updated route is not distributed to the second routing protocol agent when second routing protocol agent has a less specific route to a same destination as the first updated route.

14. The non-transitory computer readable medium of claim 10, wherein the second routing protocol agent is a Border Gateway Protocol (BGP) agent that implements BGP and the first routing protocol agent is a non-BGP agent.

15. The non-transitory computer readable medium of claim 14, wherein the first routing protocol agent is a static route agent.

16. The non-transitory computer readable medium of claim 14, wherein the first routing protocol agent is an Interior Gateway Protocol (IGP) agent.

17. The non-transitory computer readable medium of claim 14, wherein the first routing protocol agent is an Open Shortest Path First (OSPF) agent.

* * * * *